3,059,521
GROUND SPEED-ALTITUDE INDICATOR
John E. Clemens, R.R. 5, Xenia, Ohio; Ben B. Johnstone, 7387 Wilmington Pike, Dayton, Ohio; Wolfram E. Kerris, 13012 Bloomfield, North Hollywood, Calif.; and Friedrich G. Wazelt, 161 Old Spring Road, Stratford, Conn.
Filed Jan. 21, 1960, Ser. No. 3,970
9 Claims. (Cl. 88—1)
(Granted under Title 35, U.S. Code (1952), sec. 266)

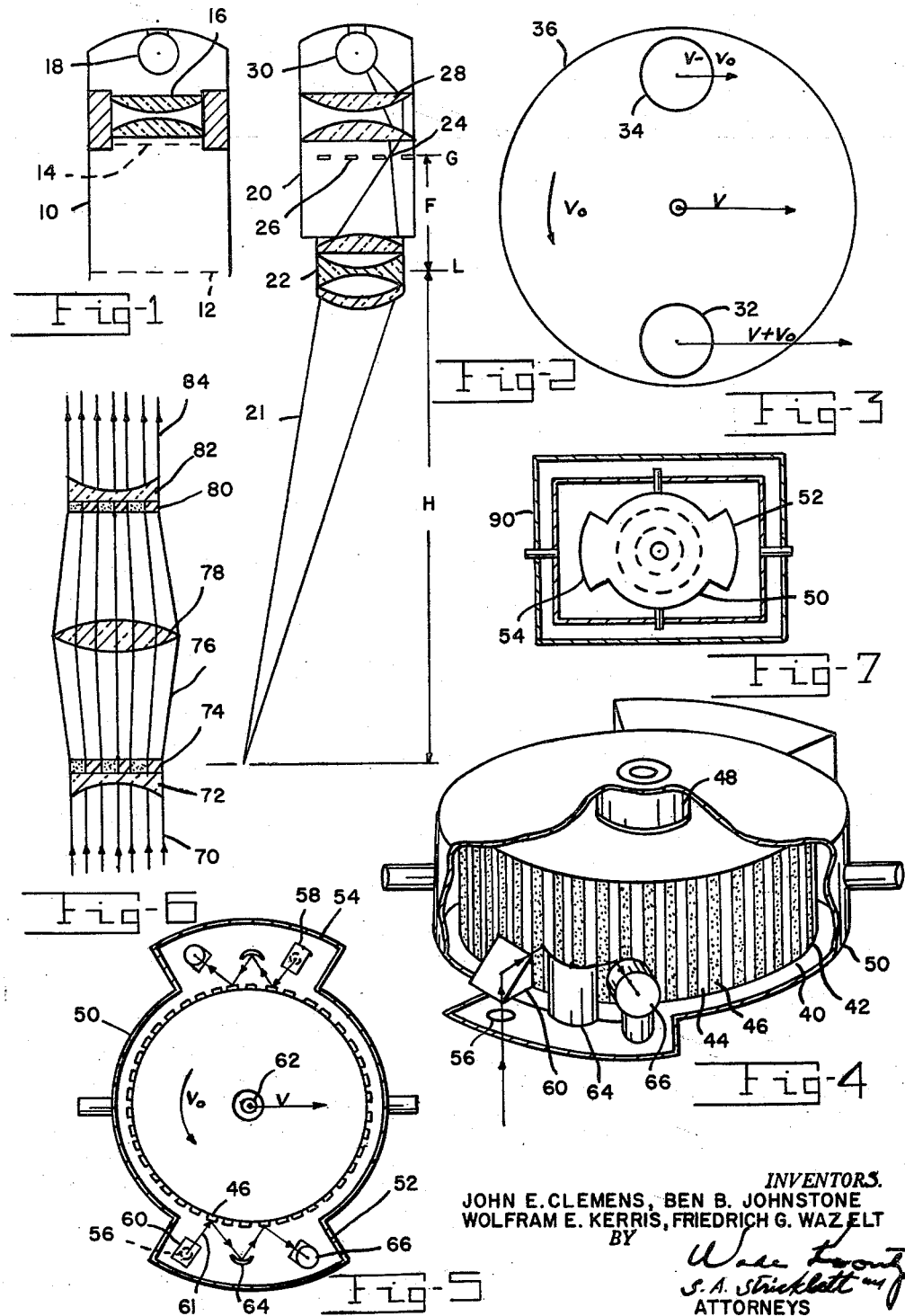

The invention described herein may be manufactured and used by or for the United States Government for governmental purposes without payment to us of any royalty thereon.

This invention relates to a ground speed-altitude indicator and particularly to an optical scanner for the independent measurement of the ground speed and of the altitude of an aircraft.

It has heretofore been proposed to utilize a number of optical devices to serve the purpose of measuring the ground speed of aircraft. For example, the speed responsive apparatus of Hammond et al., 2,439,295, utilizes a pair of spaced apart grids to interrupt a ground return beam and apply the interrupted beam to a photo electric device to produce a frequency proportional to the ground speed and altitude of the device. When the altitude of the aircraft is determined by some other device the result can be broken down to determine the ground speed.

Applicants have discovered that both the ground speed and the altitude may be separately determined by utilizing a pair of scanners and superimposing an additional speed to the motion of the scanner head—or at least to the optically important parts thereof.

The present invention utilizes a pair of scanner heads and means for imparting a progressive speed to the optical portion of one of the heads and retrograde speed to the other of the heads.

It is accordingly an object of the invention to provide an improved ground speed indicator.

It is a further object of the invention to provide an optical system for independently obtaining both the ground speed and altitude of an aircraft.

It is a further objective of the invention to provide a speed-altitude indicator which is simple and rugged in operation.

Other objects and advantages of the invention will be apparent from the following detailed description taken in conjunction with the accompanying drawing in which:

FIG. 1 is a sectional elevation of a double grid scanner;

FIG. 2 is a similar view of an improved scanner utilizing a focused beam and a single grid;

FIG. 3 is a schematic illustration of a speed-height meter utilizing the scanner of FIG. 2;

FIG. 4 is a perspective partially in section of a practical speed-height meter according to the invention;

FIG. 5 is a top plan view of the meter of FIG. 4 with the top cut away to show the arrangement of the parts;

FIG. 6 is a schematic illustration explaining the mode of operation of the device of FIG. 4; and FIG. 7 is a schematic illustration of a mount to free the device from the angular motion, such as pitch and roll of an aerial vehicle.

In the exemplary embodiment according to the invention a double grid scanning head closely approximating heretofore known devices is shown in FIG. 1 and is improved over the known device by utilizing a condenser lens to concentrate the interrupted light beam on a photo-electric generator. The scanner head of FIG. 1 consists of a substantially cylindrical shield 10 having a forward grid 12 and a rearward grid 14, which serves to interrupt the ground return beam to provide striations which are focused by condensing lens 16 on a photo-electric generator 18, which produces a voltage having a frequency determined by the ratio of heighth or altitude to the ground speed of the aircraft on which it may be mounted.

The improved scanner head of FIG. 2 is also provided with a cylindrical shield 20 in the forward end of which is mounted a lens system 22 for producing a pencil beam 21 to scan a relatively small portion of the ground surface and focus the image at point 24 on a fixed rearward grid 26 behind which is a condensing lens substantially similar to condensing lens 16 for focusing the ground beam on a photo-electric generator 30.

A progressive or retrograde motion may be added to the scanner head of FIG. 1 by causing relative movement of the grids 12 and 14. For example, the grids 12 and 14 may be mounted on a transparent drum or endless belt which can be driven so that the grids 12 and 14 will move in opposite directions. For the purpose of this invention two heads are used and the grids are moved in a progressive relation with respect to the aircraft speed in one of the scanner heads and in a retrograde relation in the other of the scanner heads.

In the modification according to FIG. 3 two scanner heads 32 and 34, of the type indicated in FIG. 2, are mounted in a revolving disc 36, which rotates in a plane substantially parallel to the ground surface. Since the aircraft moves forward with relation to the ground at the velocity indicated at V and the disc 36 has a peripheral speed indicated at $V_0$, it will be apparent that the head 32 will have a progressive speed equal to craft ground speed V plus the rotation speed $V_0$ when the scanner head 32 is moving substantially parallel to the direction of motion of the vehicle. Also, that the scanner head 34 will at the same time have a speed indicated by vehicle speed V minus the rotational speed $V_0$. The operation of the devices will best be understood by first considering the operation of a single head, such as that shown in FIGS. 1 and 2.

In the construction, according to FIG. 1, the grids 12 and 14 produce a frequency proportional to altitude and ground speed because of the interruption of the light beams through the front grid by the back grid so that the pencil of light is applied to the photo-electric generator 30 that produces a voltage having a frequency determined by the periodical transmission of light through the grids. Obviously, if the grids are moved at a speed progressive with respect to the speed of the craft, the frequency will be increased. Also, if the speed of the forward grid 12 is retrogressive with respect to the aircraft speed, the frequency will be decreased.

In the improved modification according to FIG. 2, the lens 22 of the scanner head forms an image 24 of the ground in the plane of the grid 26 which is preferably arranged in the focal plane of the lens 22 so that if the scanner head is moved with a speed V parallel to the ground, the image 24 of an object on the ground moves across the grid 26 thus generating brightness fluxations which are sensed by the photo cell 30.

With the speed of the image 24 designated by $v$, the focal length of the lens 22 by F, and the altitude by H one can write $$\frac{v}{V} = \frac{F}{H} \quad (1)$$

If the pitch of the grid 26 (number of lines per unit length) is designated by $z$, the generated frequency is $$n = zv \quad (2)$$

By introducing (2) into (1) one obtains $$\frac{V}{H} = \frac{n}{zF} \quad (3)$$

Thus, the output of the device is the ratio of ground speed and altitude. In order to obtain V with a single scanner head of either type one has to measure H with some other device (radar altimeter) and to introduce this value into (3).

This is a basic property of all devices based on ray pencils of light beams.

However, one can obtain V and H separately by superimposing additional speed through motion of the scanner head as by imparting motion to the grids 12 and 14 or by rotating disc 36 carrying heads 32 and 34.

In FIG. 3 which represents one form of realization, the two scanner heads 32 and 34 are mounted on the horizontal disc 36 having a circumferential velocity $V_0$ while the ground velocity of an aircraft is designated by V, one can write the velocity of the scanner head 32 being presented in the position indicated $$V_1 = V + V_0 \quad (4)$$

and of the scanner head 34 the speed can be indicated as $$V_2 = V - V_0 \quad (5)$$

Introducing (4) and (5) into (3) one obtains for head 32

$$\frac{V+V_0}{H} = \frac{n_1}{zF} \quad (6)$$

while for scanner head 34

$$\frac{V-V_0}{H} = \frac{n_2}{zF} \quad (7)$$

One obtains V separately by dividing (6) and (7) whereby $$V = \frac{n_1 + n_2}{n_1 - n_2} \times V_0 \quad (8)$$

and one obtains H separately by subtracting (6) and (7) whereby $$H = 2zF \frac{V_0}{n_1 - n_2} \quad (9)$$

In order to have an accuracy comparing with the accuracy of the N-measurement, it is obvious that $V_0$ must be of the same order of magnitude as V. In other words the peripheral speed of the scanner in FIG. 3, or the grids of FIG. 1 must be substantially equal to the ground velocity of the aircraft.

For high speed aircraft it has been found impractical to rotate the lens systems with such a speed or to operate the grids with the desired speed. Since the spinning transparent or lens systems imposes various limitations on the circumferential speed, a modification of FIG. 4 has been constructed to provide a rugged material body which will move at the desired circumferential speed while the lens and scanning and generating systems remain fixed.

In the construction according to FIG. 4 the rotating body 40 is provided with a substantially cylinder surface 42 which is constructed as a reflecting mirror having bars 44 and 46, which are respectively reflecting and non-reflecting. The non-reflecting bar 46 may be constructed in various ways, such as by applying a non-reflecting paint to a portion of the reflecting surface 42, or grinding, engraving, or otherwise destroying the reflective properties of the surface 42 to construct non-reflecting bars 46. Preferably the body 40 is a present portion of the aircraft structure, such as a wheel of the gyroscope driven by a motor 48. The optical systems may be readily added to the case of a gyroscope by extending the housing 50 at 52 and 54 to provide a platform for receiving the stationary portion of the optical system. A ground objective 56 and 58 are provided in the platform and are preferably of the type shown as lens 22 of FIG. 3. A beam diverting means, such as prism 60, or an angular position mirror (not shown), is utilized to divert the ground beam against the vertical surface 42 of the body 40. Preferably the deflecting devices 60 are directed slightly forward of the perpendicular from the objective to the axis of the rotating body 62 so that the beam, when reflected from the mirror surface of the bars 44, will be directed to condensing lens 64. At the time that the beam from deflector 60 is directed to the non-reflecting bars 46, the beam will be interrupted. Since the surface 42 is the outer surface of a cylinder, it will be convex and will have a scattering effect. However, the condensing effect of mirror 64 will redirect the beam to the surface 42, which will re-reflect the beam to the photo-electric generator 66.

This operation is better understood by reference to FIG. 6 in which the ground pencil 70 passes through the scattering lens 72 and the grid 74 corresponding to the bars on the convex surface 42. The scattering bars 76 then are collected by the condensing lens 78 corresponding with the condensing mirror 64 and again contact the bars 44 and 46 of grid 80 and scatter lens 82 to restore an interrupted beam 84, which passes to the photoelectric generator 66.

It will be apparent that if the aircraft is moving in such a direction as shown by the arrow v in FIG. 5, and if the objectives are mounted substantially transverse to the direction of motion of the aircraft, the speed of the beam from the objective 56 will be progressive and the speed of the beam from the objective 58 will be retrograde. Since the body 40 is of relatively strong material and can be of any desired diameter, it is obvious that the peripheral speed may approach ground speed of the vehicle without danger. In order to eliminate interference because of the pitch or roll of the aircraft, the platforms 52 and 54 may be mounted in a gimbal 90 as indicated in FIG. 7.

For purposes of exemplification particular embodiments of the invention have been shown and described according to the best present understanding thereof; however, it will be apparent to those skilled in the art that various changes and modifications in the construction and arrangements of the various parts thereof may be readily resorted to without departing from the true spirit and scope of the invention.

We claim:

1. A ground speed-height indicator for an aircraft comprising a platform mounted on said aircraft for universal movement with respect to the aircraft, a gyroscope mounted on said platform for maintaining said platform substantially parallel to the ground, said gyroscope having a substantially cylindrical mirror surface on the outer periphery thereof, said cylindrical surface extending substantially perpendicular to the ground, a non-reflecting grating on said mirror surface, a ground beam receiver mounted on said platform on each side of the cylindrical surface on a line substantially transverse to the direction of motion of said aircraft, means for directing the ground beam of each receiver against the mirror surface at an angle forward of the perpendicular to the mirror surface, a concave mirror mounted to receive the interrupted beam from said mirror surface and redirect said beam against another portion of said surface, a photo electric generator mounted to receive the beam reflected from said another portion of said mirror surface, said generators producing voltages having frequencies proportional to ground speed.

2. A ground speed-altitude measuring device for mounting on an aerial vehicle comprising a rotating body mounted on the vehicle for rotating about an axis substantially vertical to the ground, a substantially cylindrical reflecting surface on said rotating body, a non-reflecting grid on said reflecting surface, a pair of optical scanners mounted one on each side of said body on a line substantially transverse to the direction of motion of the vehicle, each of said scanners including an objective for receiving a beam from the ground, means for directing said beam against the reflecting surface on said body at an angle with respect to the perpendicular from said objective to the reflecting surface, a condensing mirror mounted to receive the objective beams reflected from said reflecting surface, said condensing mirror directing the condensed beam against said reflecting surface, a photo-electric generator positioned to receive the re-reflected beam.

3. A ground speed-height indicator comprising a platform mounted for universal movement on an aircraft, a pair of ground beam objectives mounted in spaced apart relation on said platform, a cylindrical grid mirror rotatably mounted between said objectives for rotation in a plane parallel to said platform, said objectives being arranged on a line substantially transverse to the direction of motion of said aircraft with respect to the ground, a prism for each of said objectives, said prisms directing the respective ground beams against the opposite sides of said grid mirror, a concave mirror adjacent each side of said grid mirror to reflect said beams against said grid mirror, a photo electric device mounted to receive each of said beams, and means to rotate said grid mirror.

4. A ground speed-height indicator comprising a platform mounted for universal movement on an aircraft, a pair of ground beam objectives mounted in spaced apart relation on said platform, a cylindrical grid mirror mounted between said objectives for rotation in a plane parallel to said platform, said objectives being arranged on a line substantially transverse to the direction of motion of said aircraft with respect to the ground, beam deflecting means for each of said objectives for directing the respective ground beams against the opposite sides of said grid mirror at an angle to the perpendicular from said objectives to said grid mirror, a concave mirror adjacent each side of said grid mirror to reflect the respective beams against the said grid mirror, a photo-electric device mounted to receive each of said beams, and means to rotate said grid mirror, the peripheral speed of said mirror being of the order of the ground speed of the aircraft.

5. A ground speed-height indicator for an aircraft comprising a pair of ground viewing objectives, said objectives being mounted in spaced apart relation on the craft on a line substantially transverse of the direction of flight of the craft, a revolving cylindrical mirror mounted between said objectives, said mirror having alternate reflecting and non-reflecting bars, a beam deflecting means mounted to receive the light from each of said objectives for directing the light from the respective objectives against the opposite sides of said revolving mirror, a concave mirror mounted to receive the reflected divergent light from said revolving mirror and return the beam to another portion of the revolving mirror and a photo-electric generator mounted to be energized by the beam reflected from said portion of said revolving mirror.

6. A height-ground speed meter comprising a rotating cylindrical mirror mounted for rotation about an axis substantially perpendicular to the ground surface, a pair of optical scanners mounted one on each side of said cylindrical mirror, each of said scanners including a ground viewing objective, means for deflecting a ground beam from said objective against the outer surface of said mirror at an angle with the perpendicular from said objective to said mirror, a concave mirror mounted to receive the beam from said cylindrical mirror, said concave mirror redirecting said beam against said cylindrical mirror, a photo-electric generator receiving the rereflected beam from said mirror, said mirror having alternate reflecting and non-reflecting bars, means for rotating said cylindrical mirror.

7. A height-ground speed indicator for an air vehicle comprising a pair of optical scanners, a rotating body mounted on said vehicle for rotation in a plane substantially parallel to the ground surface whereby one lateral side of said rotating body has a progressive speed with respect to the ground speed of the vehicle and the opposite side has a retrograde speed with respect to the ground speed, means individual to the two optical scanners for receiving their light outputs, and light interrupting means attached to said body and having as a result progressive and retrograde speeds, said light interrupting means acting where it has progressive speed to interrupt the light to the receiving means for one of said scanners at a rate proportional to the algebraic sum of the ground speed of said vehicle and said progressive speed and acting where it has retrograde speed to interrupt the light to the receiving means for the other of said scanners at a rate proportional to the algebraic sum of the ground speed of said vehicle and said retrograde speed.

8. A ground speed altitude measuring device for mounting on an aerial vehicle comprising a rotating body mounted on the vehicle for rotating about an axis substantially vertical to the ground, a substantially cylindrical reflecting surface on said rotating body, a non-reflecting grid on said reflecting surface, a pair of optical scanners mounted one on each side of said body on a line substantially transverse to the direction of motion of the vehicle, each of said scanners including an objective for receiving a beam from the ground, means for directing said beam against the reflecting surface on said body at an angle with respect to the perpendicular from said objective to the reflecting surface, a condensing mirror mounted to receive the objective beams reflected from said reflecting surface, said condensing mirror directing the condensed beam against said reflecting surface, a photo-electric generator positioned to receive the rereflected beam, means for driving said body so that the speed of said reflecting surface is of the order of the ground speed to be measured.

9. A ground speed-height indicator comprising a pair of optical scanners for mounting on a moving body whose ground speed is to be determined, said scanners viewing the terrain below the body, rotating means for providing a progressive and a retrograde speed with respect to the ground speed of said body, means for interrupting the scanning beam of one scanner at a speed proportional to the sum ground speed and the progressive speed and means for interrupting the beam of the other scanner at a speed proportional to the sum of ground speed and the retrograde speed, photo-electric means for receiving each of said beams, said photo-electric means providing a frequency corresponding to each of said speeds.

References Cited in the file of this patent
UNITED STATES PATENTS 2,772,479    Doyle               Dec. 4, 1956
2,830,487    Griffith            Apr. 15, 1958